(12) United States Patent
Carr et al.

(10) Patent No.: US 6,557,858 B1
(45) Date of Patent: May 6, 2003

(54) UNITARY DOUBLE RING SEAL

(75) Inventors: Neil Anthony Carr, Oxfordshire (GB); Trevor Norman Walker, Oxfordshire (GB)

(73) Assignee: United Kingdom Nirex Limited, Oxfordshire (GB)

( * ) Notice: Subject to any disclaimer, the term of this patent is extended or adjusted under 35 U.S.C. 154(b) by 0 days.

(21) Appl. No.: 09/762,309

(22) PCT Filed: Jul. 29, 1999

(86) PCT No.: PCT/GB99/02481

§ 371 (c)(1),
(2), (4) Date: Jun. 6, 2001

(87) PCT Pub. No.: WO00/08362

PCT Pub. Date: Feb. 17, 2000

(30) Foreign Application Priority Data

Aug. 4, 1998 (GB) .............................................. 9816974

(51) Int. Cl.[7] ................................................ F16J 15/02
(52) U.S. Cl. ........................ 277/644; 277/628; 277/645; 277/646
(58) Field of Search ................................ 277/605, 645, 277/646, 628, 644

(56) References Cited

U.S. PATENT DOCUMENTS

| | | | |
|---|---|---|---|
| 3,501,868 A | * | 3/1970 | Ganzinotti .................. 277/646 |
| 3,643,965 A | * | 2/1972 | Nicholson |
| 3,858,752 A | | 1/1975 | Marvin, Jr. et al. |
| 5,044,823 A | * | 9/1991 | Burgess |
| 5,611,550 A | * | 3/1997 | Belser |
| 5,687,976 A | * | 11/1997 | Andrick et al. |
| 6,264,207 B1 | * | 7/2001 | Krestel ........................ 277/645 |

FOREIGN PATENT DOCUMENTS

| | | | |
|---|---|---|---|
| CH | 160239 | 5/1933 | |
| DE | 3216054 A1 | 11/1983 | |
| FR | 2.119.258 | 8/1972 | |
| FR | 2 461 174 | 1/1981 | .................... 15/12 |
| FR | 2 691 991 | 12/1993 | |
| GB | 451417 | 8/1936 | |
| GB | 1 390 756 | 4/1975 | .................... 15/10 |
| GB | 2 265 675 | 10/1993 | ....................... 5/12 |

OTHER PUBLICATIONS

"Search Report" issued by the EPO for PCT/GB99/02481.
"Written Opinion" issued by the EPO for PCT/GB99/02481.

* cited by examiner

Primary Examiner—Anthony Knight
Assistant Examiner—E Peavey
(74) Attorney, Agent, or Firm—Westman, Champlin & Kelly, P.A.

(57) ABSTRACT

A double ring seal of unitary construction is made from a resilient deformable material. The ring seal comprises two coplanar sealing rings for use in sealing between two substantially planar surfaces, and means interconnecting the rings, such that an interspace volume is formed between the rings when the seal is in use.

1 Claim, 4 Drawing Sheets

UNITARY DOUBLE RING SEAL

This application claims the benefit of PCT Serial No. PCT/GB99/02481, filed Jul. 29, 1999 and published in the English language.

The present invention relates to a double seal of unitary construction for hermetically sealing two substantially coplanar mating surfaces.

The shipment and storage of toxic, radioactive or otherwise hazardous material demands the use of containers which can be reliably sealed and tested for leak tightness. A sealing arrangement is described in GB 2175885 using two laterally spaced sealing members which together with the opposing surfaces of a container body and lid define an endless passage. By introduction of a pressurised gas, the endless passage can be used to verify the integrity of the sealing arrangement. The present invention aims to provide a seal suitable for use between a large steel box and a steel lid for transporting intermediate and low level nuclear waste.

The invention provides a double ring seal of unitary construction made from a resilient deformable material, comprising two coplanar sealing rings for use in sealing between two substantially planar surfaces, and means interconnecting the rings, whereby the rings form between them an interspace volume when the seal is in use. The interconnecting means may comprise a web dividing the interspace volume into upper and lower parts, said web having at least one aperture providing communication between said parts. The interspace allows the integrity of the seal to be tested by pressurisation, evacuation or sampling.

The seal may be constructed from a resilient deformable material such as an elastomer which is compressed by coplanar mating surfaces to provide a hermetic seal. To increase the compressibility and flexibility of the seal without undue increase in clamping force, the sealing rings may be hollow, vented and have a cross-sectional dimension perpendicular to the plane of the ring which is greater than the cross-sectional dimension in the plane of the ring.

An example of the invention will now be described in detail with reference to the accompanying drawings, of which:

Figure 3:
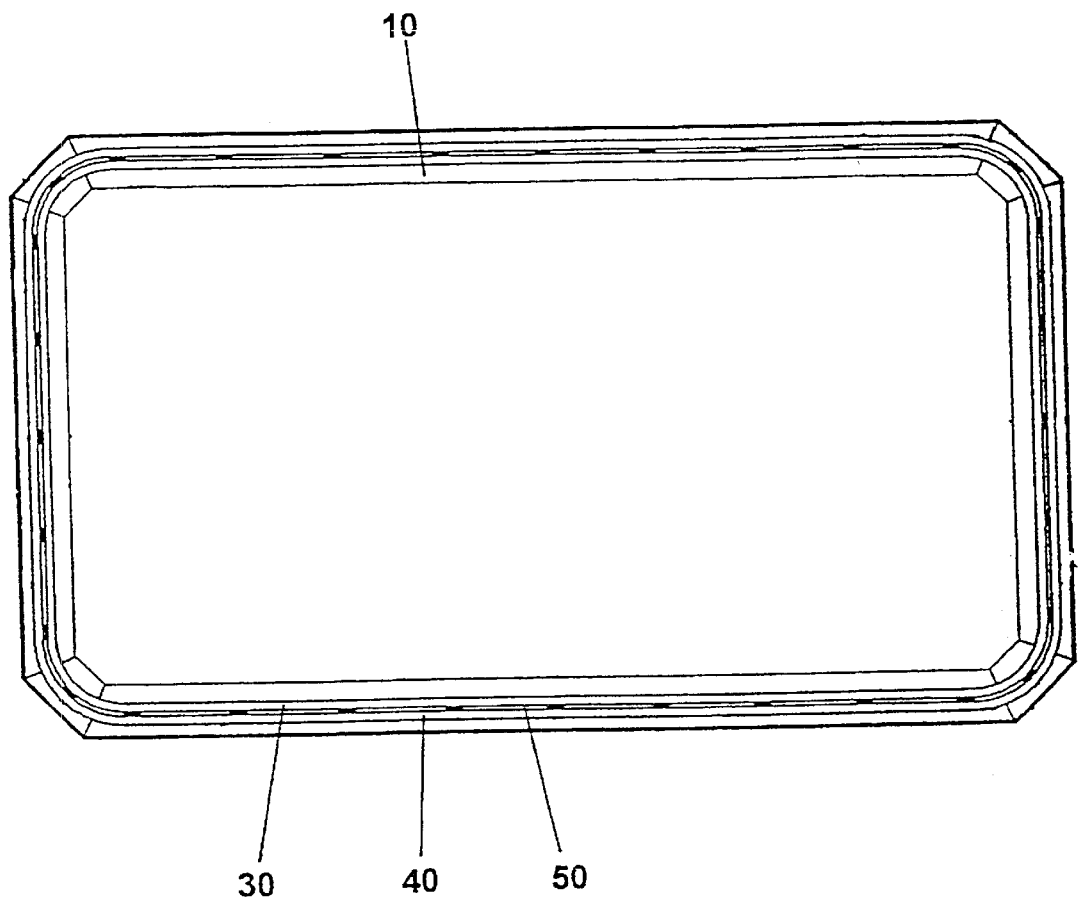
Figure 4:
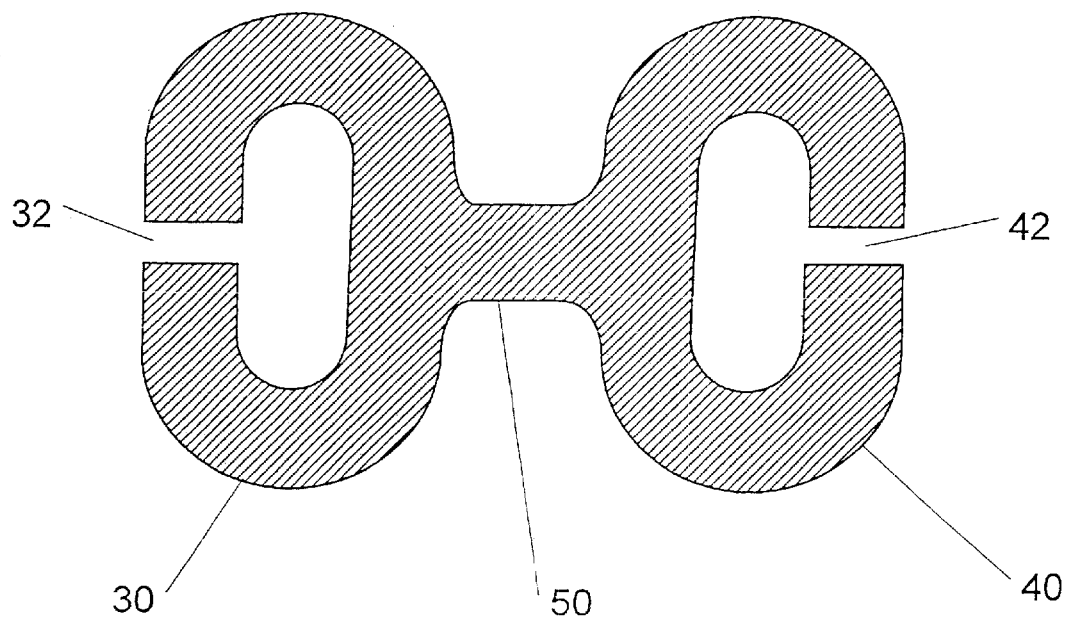

FIG. 3 depicts the seal in place on the container body 10 viewed from above with the lid 20 removed; and FIG. 4 depicts a cross-section through the uncompressed seal showing vents 32, 42 in the sealing rings 30, 40.

This example of the invention is a ring seal for use between a large steel box and a steel lid for transporting intermediate and low level nuclear waste. The overall length of the ring seal is determined by the size of the container. In this example the ring seal length is about 11 m.

Figure 1:
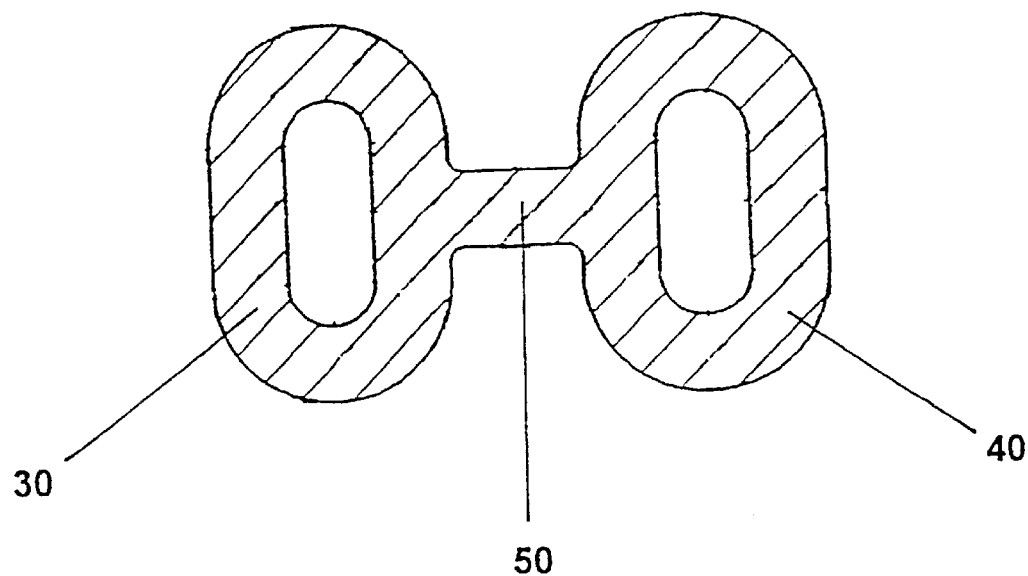
FIG. 1 depicts a cross-section through the uncompressed seal.

FIG. 1 depicts a cross-section through the uncompressed seal which is of uniform cross-section and is formed by extrusion as a single unit from a resilient deformable material, for example an elastomer such as Ethylene Propylene Terpolymer Rubber (EPDM). The seal joint is formed within a mould with a material of identical compound to that of the seal. The mould controls the outer profile of the seal during the curing cycle, resulting in a solid region local to the joint, extending over a length of approximately 75 mm.

The seal is a ring of dumbbell cross-section. The two sealing rings 30, 40 are connected by a web 50. To allow for movement during transport of the container, the following features of the sealing rings are provided to increase the compressibility of the seal:

1) The sealing rings 30, 40 are of hollow cross section.
2) Each sealing ring is vented, such as by vents 32 and 42, in the direction away from the space between the two sealing rings.
3) The sealing rings are not circular but when uncompressed have a cross-sectional dimension in the direction of compression which is greater than the cross-sectional dimension perpendicular to the direction of compression.

The hollow cross section is used to reduce the force required to compress the seal. Standard 'O' ring seals are generally solid and subject to a maximum compression of up to 25%. The seal of this example of the present invention is capable of withstanding a higher degree of compression in order to accommodate wider tolerances on manufacture and deflections of mating surfaces when in use. In this example of the invention the thickness of the seal in the direction of compression is 50 mm when uncompressed and 30 mm when compressed. The thickness of the seal wall and the seal web is 10 mm.

Figure 2:
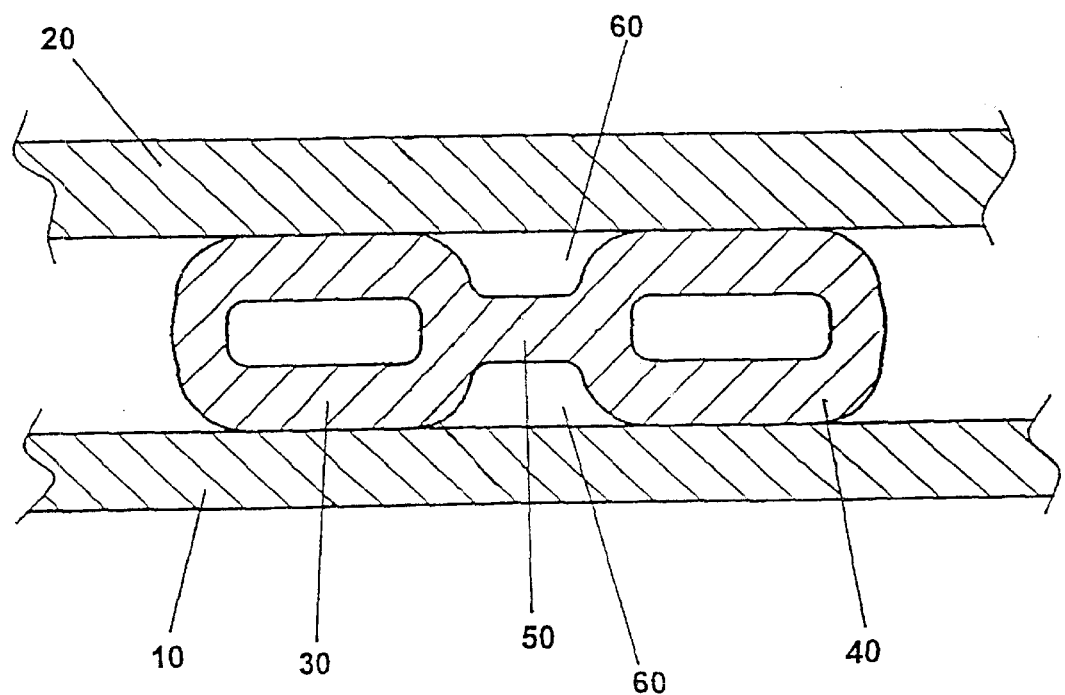
FIG. 2 depicts a cross-section through the seal compressed between a container body 10 and container lid 20.

FIG. 2 depicts the seal compressed between two coplanar mating surfaces such as a container body 10 and a container lid 20. One or more apertures are provided in the web 50 so that the interspace volumes 60 below and above the web communicate. The seal can then be checked for integrity by pressurising, evacuating or sampling the interspace.

FIG. 3 is a view from above a container body 10 with the seal in place but the lid removed. The two sealing rings are arranged as an inner 30 and an outer 40 sealing ring. Apertures are shown in the web 50 connecting the two sealing rings.

FIG. 4 depicts a cross-section through the uncompressed seal showing vents 32, 42 in the sealing rings 30, 40 according to one illustrative embodiment of the present invention. The vents 32, 42 are directed away from the space between the two sealing rings 30, 40. Vents 32, 42 allow for increased compressibility and flexibility of the seal without an undue increase in the clamping force.

What is claimed is:

1. A double ring seal of unitary construction made from a resilient deformable material, comprising two coplanar, hollow, vented sealing rings for use in sealing between two substantially planar surfaces, and means interconnecting the rings, whereby the rings form between them an interspace volume when the seal is in use, the interconnecting means comprising a web dividing the interspace volume into upper and lower parts, said web having at least one aperture providing communication between said parts, and the sealing rings each having a cross-sectional dimension perpendicular to the plane of the ring which is greater than the cross-sectional dimension in the plane of the ring.

* * * * *